US007974499B2

(12) United States Patent
Vaz et al.

(10) Patent No.: US 7,974,499 B2
(45) Date of Patent: Jul. 5, 2011

(54) METHOD AND APPARATUS FOR EFFICIENT COMPUTATION OF MORPHOLOGY OPERATIONS

(75) Inventors: Michael Vaz, Hillsboro, OR (US); Atilla Peter Kiraly, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1295 days.

(21) Appl. No.: 11/301,393

(22) Filed: Dec. 13, 2005

(65) Prior Publication Data

US 2006/0159360 A1 Jul. 20, 2006

Related U.S. Application Data

(60) Provisional application No. 60/637,653, filed on Dec. 20, 2004.

(51) Int. Cl.
*G06K 9/56* (2006.01)
*G06K 9/42* (2006.01)
(52) U.S. Cl. ........................ 382/308; 382/257
(58) Field of Classification Search .................. 382/257, 382/308
See application file for complete search history.

(56) References Cited

U.S. PATENT DOCUMENTS

| 4,866,785 | A | * | 9/1989 | Shibano | 382/257 |
| 6,175,655 | B1 | * | 1/2001 | George et al. | 382/257 |
| 6,282,328 | B1 | * | 8/2001 | Desai | 382/308 |
| 6,993,170 | B2 | * | 1/2006 | Johnson et al. | 382/128 |

OTHER PUBLICATIONS

Dan S. Bloomberg, "Implementation Efficiency of Binary Morphology", International Symposium for Mathematical Morphology VI, Sydney, Australia, Apr. 3-5, 2002.

* cited by examiner

*Primary Examiner* — Anand Bhatnagar
*Assistant Examiner* — Randolph I Chu

(57) ABSTRACT

Disclosed is an algorithm for applying a morphological operation to an image. In one embodiment, the morphological operation is iteratively applied to a focal pixel of the image and to another pixel of the image. The other pixel is located at an offset with respect to the focal pixel. The offset is based on an operation count. In another embodiment, the algorithm includes performing a morphological operation on an image using a convex structuring element. A work structuring element having dimensions corresponding to the outer-most dimensions of the convex structuring element is iteratively applied to the image. The dimensions of the work structuring element are then adjusted to correspond to the remaining outer dimensions of the convex structuring element not yet covered by the previous work structuring element. The applying and adjusting steps are repeated until a predetermined number of morphological operations have been performed.

30 Claims, 9 Drawing Sheets

METHOD AND APPARATUS FOR EFFICIENT COMPUTATION OF MORPHOLOGY OPERATIONS

This application claims the benefit of U.S. Provisional Application No. 60/637,653 filed Dec. 20, 2004, which is incorporated herein by reference.

BACKGROUND OF THE INVENTION

The present invention relates generally to image processing, and more particularly to optimizing computation of morphology operations in both binary and grayscale applications.

Mathematical morphology is used in a variety of digital image processing applications, such as computer vision and medical imaging applications (e.g., for segmentation and skeletonization tasks). For example, medical personnel may perform a Computed Tomography (CT) scan on a patient. A CT scan uses x-ray equipment to obtain image data from different angles around the human body and then processes the data to show a cross-section of the body tissues and organs. The image can then be analyzed by methods using morphological operators to highlight specific areas so that radiologists (or other medical personnel) can more easily diagnose problems associated with the patient such as cancers, cardiovascular disease, infectious disease, trauma and musculoskeletal disorders.

This type of image analysis occurs by applying morphological operators (also referred to as structuring elements (SE)) to the image. SEs of different scales can be used as during a step in performing airway or vessel segmentation. Skeletonization methods depend on repeated applications of morphological operators to compute the medial axis of given objects.

To apply a structuring element to an input image, the structuring element is traversed along the input image and an operation is performed. The fundamental morphology operations are dilation and erosion. Binary dilation is performed by computing the logical OR of the neighborhood defined by the structuring element (also referred to as a filter kernel) with respect to each pixel/voxel of the input image and assigning that value to the center of the operator. Binary erosion is performed by computing the logical AND operation of the neighborhood defined by the structuring element with respect to each pixel/voxel of the input image. In the case of gray level images, the logical OR/AND is replaced by the MAX/MIN operator to produce gray level dilation/erosion. The logical AND/OR operators along with the MAX/MIN operators are collectively referred to as comparison operators.

FIG. 1 shows an example of a 3×3 square structuring element 100 being applied to an input image 104. The operation being performed is a binary dilation, which is performed by computing the logical OR of the neighborhood defined by the structuring element 100 with respect to each pixel of the input image 104. To perform the dilation, the center pixel 108 of the SE 100 is positioned at each pixel of the input image 104 and the SE 100 takes the place of the input image pixel when the OR operator is non-zero. To put it differently, the structuring element 100 specifies which pixels of the input image 104 to OR together. Thus, the dilation operator results in an output image 112 that contains more non-zero pixels than the input image 104. The shaded pixels 116 represent the pixels that have been added as a result of the operation while the white pixels 118 are from the original input image 104. The image 112 is surrounded by pixels 120 that are "off"—that have a zero binary value and are not part of the image (i.e., pixels that are "on").

FIG. 1 also shows an example of the same square SE 100 being applied to the same input image 104 under binary erosion. As described, binary erosion uses a logical AND operation between the structuring element 100 and the input image 104. The output image 120 contains less "on" pixels relative to the input image 104. In this example, all that is left is a single pixel since there is only one location within the input image where the operator is encompassed by the image, leading to a true value for the AND operation. The image 120 is surrounded by pixels 124 that are off (i.e., have a zero binary value).

The direct application of these morphology operations is computationally intensive. In particular, the computation time needed by a computer is directly proportional to the number and type of computational operations performed, which in turn is proportional to the product of SE and image sizes. In order to have results in a timely fashion, an efficient algorithm is necessary. Otherwise, one is limited in the size of the SE or input image.

There are several algorithms that may be used to perform a morphological operation. The simplest approach is the brute force algorithm. The brute force algorithm examines all pixels/voxels within the SE per pixel computed. The results are stored onto a different image. The computation time of the brute force algorithm depends on the "digital mass" of the structuring element. The digital mass refers to the number of pixels within specified confines in the context of a two-dimensional (i.e., 2-D) geometry (i.e., its discrete area) or the number of voxels within a specified three-dimensional (i.e., 3-D) geometry (i.e., its discrete volume). Thus, in the brute force algorithm, each output pixel requires a number of operations that is equal to the digital mass of the structuring element minus one (the center pixel). Specifically, as the square structuring element 100 has a length and width of three pixels, the number of operations (also referred to below as ops) needed to obtain each pixel of the output image 112, 120 using this structuring element 100 is the area of the square structuring element 100 minus one (i.e., 8 ops). Moreover, if larger and larger structuring elements are used to obtain different output images, the amount of computational time increases exponentially. For example, as the diameter (side length) of a square structuring element increases linearly, the computation time increases proportional to the square of its diameter. For a cube, the computation time increases by the cube of its side as the side-length of the cube increases linearly.

Another technique to perform morphological operations is the factorization algorithm (e.g., homotopic decomposition). The factorization algorithm uses "fundamental" structuring elements. These fundamental structuring elements are used to "break down" larger structuring elements. Hence, instead of applying one large SE to an image, a series of fundamental SEs are used instead. The final outcome is the same, but the computational is reduced since the number of operations necessary for smaller SEs is less than that for one single large SE. For example, suppose a structuring element is a radius 2 cube. Under the brute force algorithm, $5^3-1=124$ ops are needed per output image voxel. Using the factorization algorithm, however, $(3^3-1)*2=52$ ops per output image voxel are needed. With factorization, the computational expense is proportional to the discrete diameter of the cube that bounds the considered structuring element rather than its digital mass. Thus, the factorization algorithm provides significant computational savings with respect to the brute force technique.

The factorization algorithm also, however, has a major pitfall—the shape of larger structuring elements that the algorithm can be used on without approximation is severely limited and bounded by the fundamental structuring elements used. For example, a two dimensional digitized circle structuring element or a three dimensional sphere structuring element are the shapes often used to perform medical image processing due to the structure of the human body (e.g., the airway). The factorization algorithm, however, typically cannot be used on a circular or spherical structuring element without excessive complexity because of the shape of the possible fundamental structuring elements relative to the shape of a digitized circle or sphere. Hence, for practical purposes, the best possible outcome is an approximation of a circle or sphere.

As a result, there remains a need to reduce computational time, especially for circles and spheres, when performing morphological operators without constraining the shape of a structuring element.

BRIEF SUMMARY OF THE INVENTION

The present invention is an efficient method for applying morphological operations to an image. Both binary and gray-scale morphology is supported in multi-dimensional images. A morphological operation (e.g., dilation or erosion) is iteratively applied to a focal pixel of the image and to another pixel located at an offset with respect to the focal pixel. The offset is based on an operation count, which increments every time that the morphology operation has been applied. The operation count increases starting from one to a predetermined number of operations. The offset for all but the last two operations is determined by $2^{N-1}$, where N is the operation count.

The number of operations needed is based on a logarithm of a predetermined length of a structuring element being applied to the image. In particular, the number of operations needed is equal to the ceiling of $\log_2$ (Q), where Q is a predetermined length of the structuring element in the specific dimension. All operations (comparisons) proceed in a specific direction, relative to the central pixel except for the last operation, which proceeds in the opposite direction. The offset of the last operation is a negative of floor(Q/2). The second to last operation has an offset of ceiling $(Q/2)-2^{(N-2)}$, where N is the operation count.

In one embodiment, the structuring element further includes a predetermined width and/or a predetermined height. In some embodiments, the pixels are voxels.

The method also includes performing a morphological operation on an image using a convex structuring element. A work structuring element having dimensions corresponding to the outer-most dimensions of the convex structuring element is iteratively applied to the image. An additional working canvas (image) is used for intermediate computations. The dimensions of the work structuring element are then adjusted to correspond to the remaining outer edge dimensions of the convex structuring element not yet covered by the previous work structuring element. This adjustment always becomes larger, allowing for the results of the previous iteration to be used in the current iteration. The applying and adjusting steps are repeated until a predetermined number of morphological operations have been performed, resulting in the morphology computation of the given convex structuring element.

The convex structuring element may be a circular disk, a sphere, or an ellipse. The work structuring element may be a one-dimensional structuring element or a rectangular structuring element. It may also be a diamond shape or diagonal element. The previous number of comparisons further include a ceiling of a logarithm of a current length and a previous length of the work structuring element.

These and other advantages of the invention will be apparent to those of ordinary skill in the art by reference to the following detailed description and the accompanying drawings.

DETAILED DESCRIPTION

Figure 1:
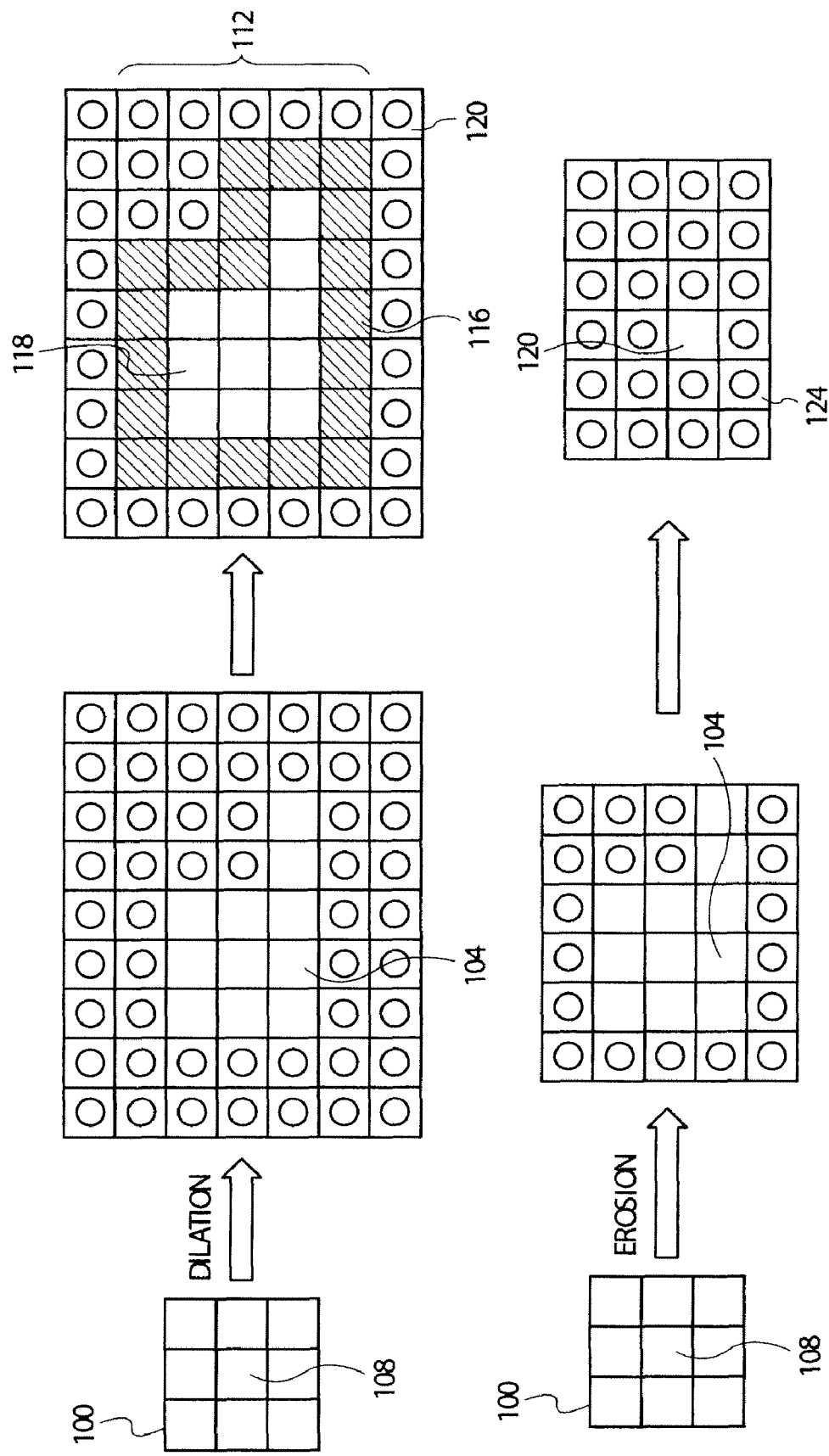
FIG. 1 shows a prior art block diagram of a binary dilation and erosion of an input image by a 3×3 square structuring element.
Figure 2:
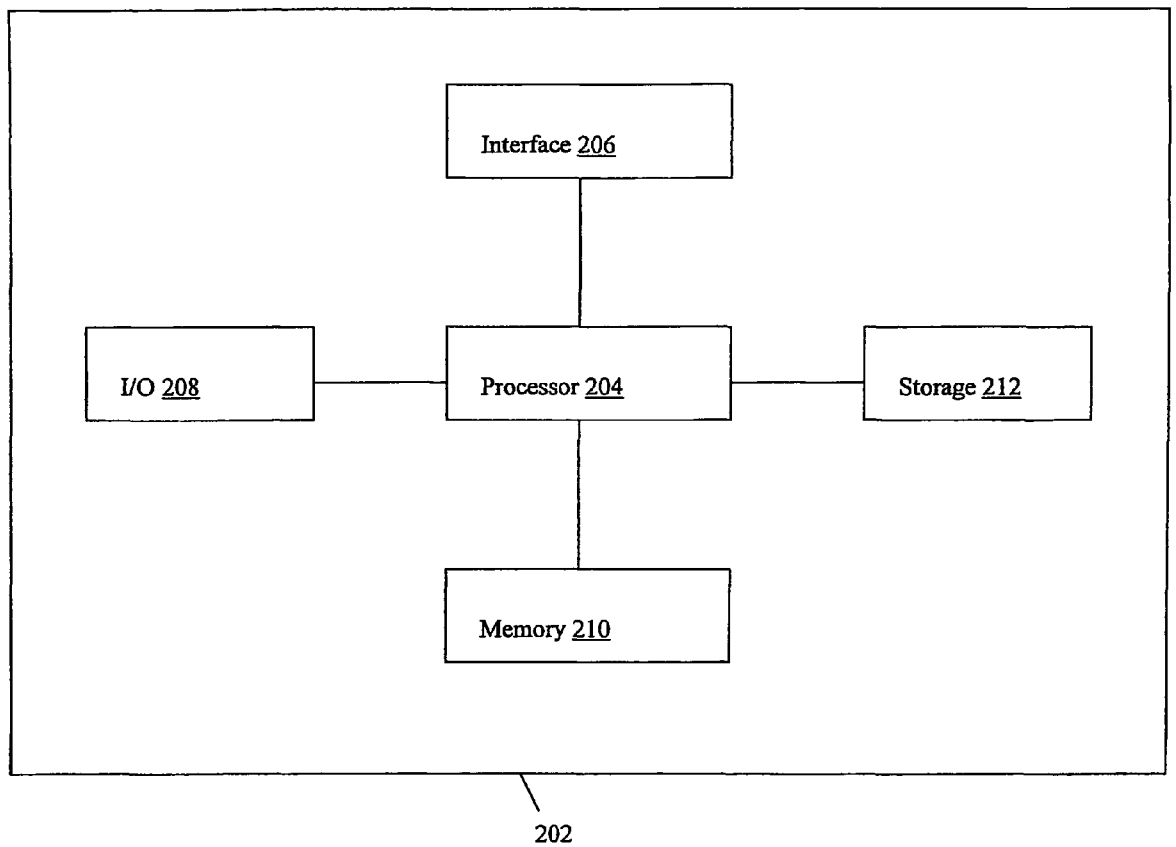
FIG. 2 is a high level block diagram of a computer in accordance with an embodiment of the invention.

The following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 2. Computer 202 contains a processor 204 which controls the overall operation of computer 202 by executing computer program instructions which define such operation. The computer program instructions may be stored in a storage device 212 (e.g., magnetic disk) and loaded into memory 210 when execution of the computer program instructions is desired. Computer 202 also includes one or more interfaces 206 for communicating with other devices (e.g., locally or via a network). Computer 202 also includes input/output 208 which represents devices which allow for user interaction with the computer 202 (e.g., display, keyboard, mouse, speakers, buttons, etc.). One skilled in the art will recognize that an implementation of an actual computer will contain other components as well, and that FIG. 2 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software.

Figure 3:
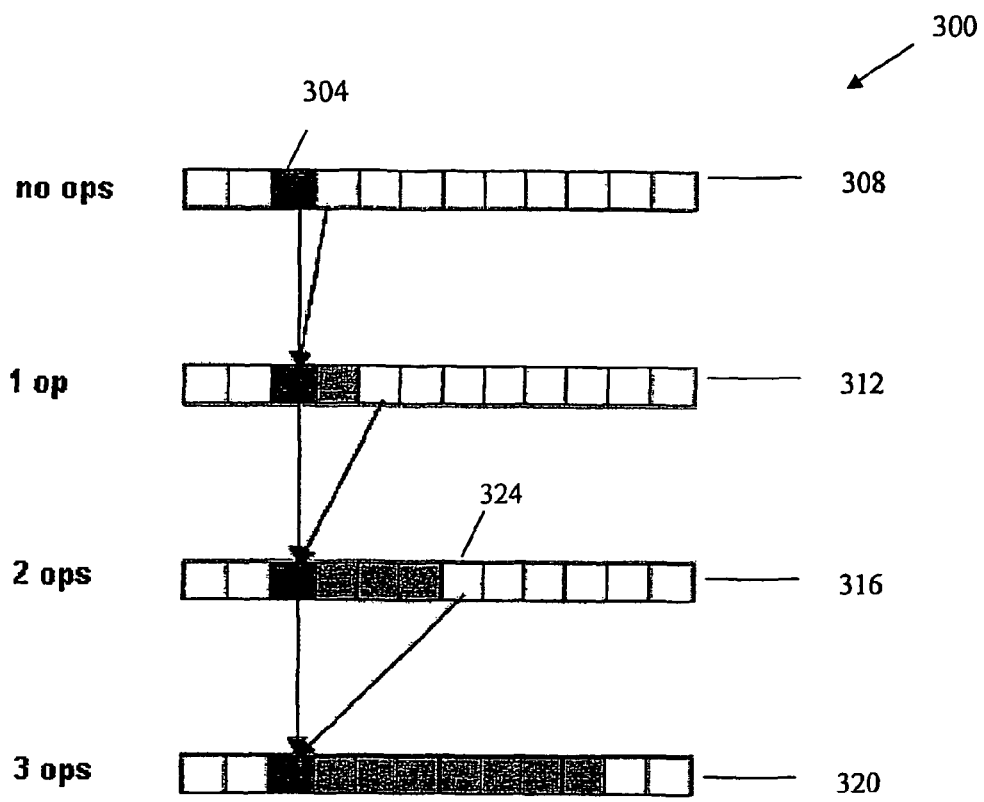
FIG. 3 is a block diagram of an optimized morphology algorithm on a 1-dimensional (1-D) row in accordance with an embodiment of the invention.

FIG. 3 shows a block diagram of a one-dimensional image canvas 300, highlighting a pixel of interest (i.e., a focal pixel) 304. An image canvas 300 is an area of pixels (or voxels) that includes the image. Focal pixel 304 is used to better convey how a single pixel is affected through a series of operations referred to below as an optimization algorithm, although these operations are applied to every pixel of the input image. In the example, instead of the brute force method, a series of comparison are done between only two image elements at each step in the image canvas 300. This is similar to having a two-element (sparse) SE for that particular step. Each application involves an increasing right offset between the two image elements: the logical OR (although this can be one of the logical OR, logical AND, MAX, or MIN operations) of each pixel in the row with its right neighbor (i.e., to dilate each pixel with its neighbors to the right hand side). The optimization algorithm exploits the idempotency property of the comparison operators (i.e., performing the operator on an element more than one time produces the same result as if the operator is applied once).

The computer 202 performs this first operation in-place (i.e., the result of the OR operation between the focal pixel 304 and its right neighbor pixel is output at the focal pixel 304). This first dilation occurs from row 308 (i.e., no ops row) to row 312 (the 1 op row). It should be noted that each operation described below for each example is vectorized. That is, each operation results in replacing the focal pixel as the computation continues. Thus, for the first operation, every pixel in the canvas 300 is replaced by the logical OR between itself and its immediate right neighbor.

As a result, each pixel's output is the result of the operation between itself and a neighboring pixel. This is referred to below as the span of the operation—i.e., which pixels contribute to the result of the information stored in a pixel. The span for the focal pixel 304 in FIG. 3 is shaded. After one operation, the span of the focal pixel 304 in row 312 is itself and its right neighbor.

Next, the logical OR operation is performed between each pixel and the pixel one-over to the right instead of its neighboring pixel. This is shown with the arrows going from row 312 to row 316. Thus, after performing two OR operators, the span is four pixels. The span is four pixels because this logical OR operation in effect covers the focal pixel 304 and its right neighbor as well as the third pixel and its right neighbor.

The next operator is performed on the fourth pixel 324, as shown from row 316 to row 320. By logically ORing the focal pixel 304 with the fourth pixel 324, the span grows to eight pixels. Specifically, similar to the focal pixel 304 being the result of the logical OR operation with its three adjacent neighbors (i.e., four pixels), the fourth pixel 324 is the result of the logical OR with its three adjacent neighbors (i.e., four pixels). Therefore, the span when 3 ops have been performed is eight pixels. The effect of the 3 ops performed on the image is the same as computing an 8-pixel wide SE on the image.

The maximum span that can be covered in M number of ops per output pixel is $2^M$. The inverse of this determination is that the minimum number of operations required to perform a morphological comparison of N contiguous pixels $M_{min}$ is defined by:

$$M_{min} = \mathrm{CEIL}(\log_2(N))$$

Comparing the optimization algorithm described above with the brute force technique, the optimization algorithm is the equivalent of performing eight logical OR operations (i.e., eight dilations) in only three ops. The brute force technique, however, requires eight ops to perform eight logical OR operations. Thus, the optimization algorithm provides significant computation savings.

As a specific example, suppose a 1-D four pixel structuring element having a center at the leftmost pixel shown below (bold) is used to dilate an input image also shown below:

|   |   |   |   |   |   |   |   |   |   |   |   |
|---|---|---|---|---|---|---|---|---|---|---|---|
|   | 1 | 1 | 1 | 1 |   |   |   |   |   |   | structuring element |
| 0 | 0 | 0 | 0 | 0 | 1 | 0 | 0 | 0 | 0 | 0 | input image |

With the brute force approach, the center pixel of the structuring element is lined up with each pixel of the input image and then the neighborhood of the input image defined by the structuring element is ORed together. This results in an output image of:

0 0 1 1 1 1 0 0 0 0 0.

Using the optimization algorithm on the input image alone, the result obtained is shown below for each operation:

| no ops: | 0 0 0 0 0 1 0 0 0 0 0 |
|---|---|
| 1 op: | 0 0 0 0 1 1 0 0 0 0 0 |
| 2 ops: | 0 0 1 1 1 1 0 0 0 0 0 |

As shown, the optimization algorithm produces the same result as the brute force algorithm after two operations. The number of operations needed for a four pixel 1-D structuring element can be determined from the equation described above: $2^N=4$; N=2 ops. Thus, 2 ops are needed to obtain the same output image as is obtained when applying a four pixel 1-D structuring element. In the above explanation, only ops in one direction are shown. This only allows for SEs with left-sided center pixels. As will be shown, the use of a single op in the opposite direction allows for symmetric operators.

Figure 4:
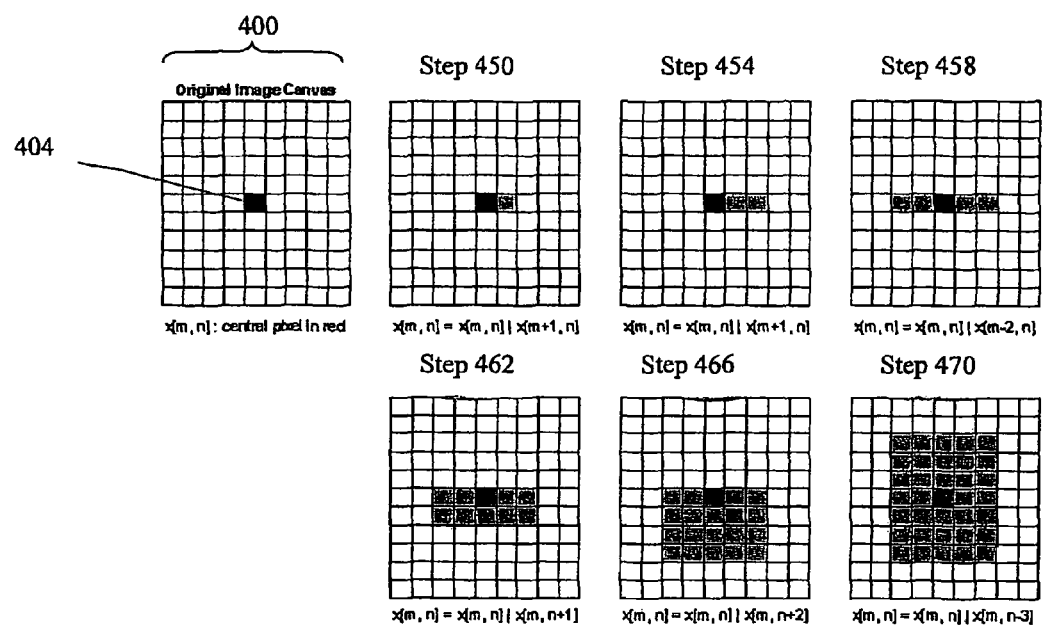
FIG. 4 is a block diagram of a binary dilation for a 5×7 rectangular structuring element using an optimization algorithm in accordance with an embodiment of the invention.

Based on the principles described above, a rectangular structuring element optimization algorithm can be used to apply a rectangular structuring element to an image. FIG. 4 shows a block diagram of the binary dilation for a 5×7 rectangular structuring element using the optimization algorithm for an image canvas 400. A focal pixel 404 represents a pixel of interest, but, as stated above, the operations are vectorized.

Step 450 shows the focal pixel 404 representing a logical OR between itself and its right neighbor. Next, in step 454, the logical OR is again performed between the focal pixel 404 and its right neighbor. This increases the span to include two pixels to the right of the focal pixel 404 (as shown in Step 454) (because of vectorization). Thus, the focal pixel 404 contains information associated with both of the shaded pixels in Step 454. In Step 458, the computer 202 reverses the direction of the distal pixel compared to the focal pixel 404 (i.e., focal pixel x[m,n]=x[m,n]|x[m−2,n]) so that the span extends in the opposite direction. This is to maintain span symmetry with respect to the focal pixel 404 for the rectangular structuring element. At the end of Step 458, each pixel has a span which is a row of length 5.

In Step 462, the computer 202 then computes the logical OR between the focal pixel 404 and the pixel immediately beneath it. This is actually the logical OR between ten original pixel values located in a 5×2 neighborhood. The computer 202 continues to implement the optimization algorithm in Steps 466 and 470 in the same manner as in Steps 454 and 458 except the algorithm is applied vertically instead of horizontally. The final result is shown in step 470. The focal pixel 404 represents the dilation result of a 5×7 rectangular structuring element with the image canvas 400. Further, although described above with respect to a 2-D rectangular structuring element, the above optimization algorithm can additionally apply to a three-dimensional rectangular structuring element (e.g., 5×5×7).

Although described below as applying the binary dilation operator (i.e., a logical OR), the optimization algorithms can use any of the comparison operators. Therefore, the OR operator can equally be replaced by any of the other morphological comparison operators (e.g., AND, MIN, or MAX). This ability allows application of the method to both binary and grayscale domains. The application of the method in diagonal directions allows for morphology computation of diamond-shaped structuring elements.

Figure 5:
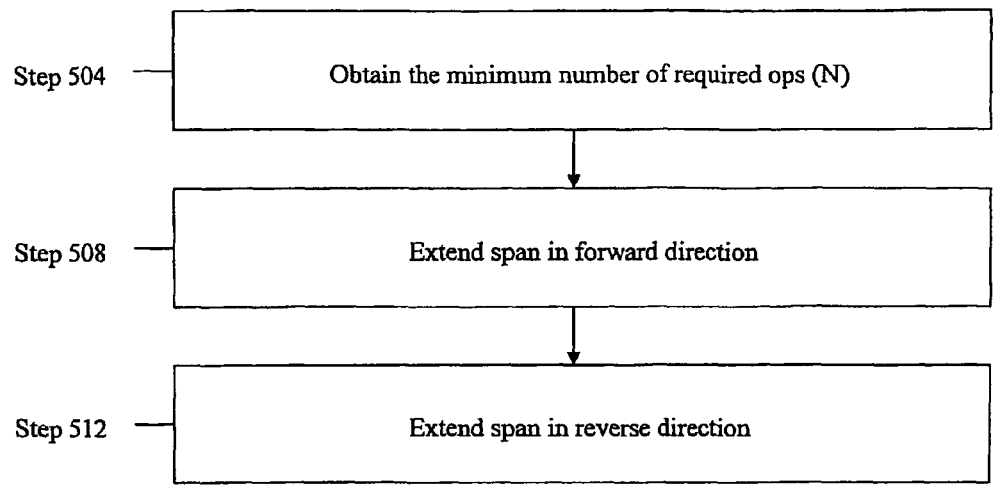
FIG. 5 is a flow chart of the optimization algorithm for dilation of an image with a rectangular or cubic structuring element in accordance with an embodiment of the invention.

FIG. 5 shows a flow chart of the optimization algorithm for dilation with a rectangular or cubic structuring element. The flow chart shows the generalization in the 1-D case, as the 2-D case and 3-D case are both extensions of the 1-D case (i.e., applied to a different axis). Therefore, FIG. 5 shows the optimization algorithm to efficiently obtain a logical comparison of an odd length (Q) run of binary pixels, while taking care to maintain symmetry in the final result.

The minimum number of required ops (N) needed to compare the Q number of pixels is first determined in step 504. This minimum number is given by the equation described above:

$$N_{min} = \text{CEIL}(\log_2(Q))$$

As the final result is going to be symmetric, all ops (i.e., the first N−1 ops) except for the last one (i.e., N) will be expended increasing the span in one direction (referred to as the forward direction) in step 508. The last op will be expended extending the span in the reverse direction.

It is necessary to obtain the offsets for each op relative to the focal pixel. There will be N−1 forward offsets for the cumulative logical ops because the last op will be in the reverse direction. The first N−2 ops (i.e., all but the last forward op) is carried out at offsets of $2^P$ with respect to the focal pixel, where P∈[0, 1, 2, . . . (N−2)−1]. The last forward offset is $\text{CEIL}(Q/2)-2^{(N-2)}$.

The computer 202 then extends the span in the reverse direction in step 512. The computer 202 first determines the offset for the last op with respect to the focal pixel. This offset is −FLOOR(Q/2), with the minus sign used to denote that the offset is in the reverse direction.

For example, for N=2, there is only one forward offset (N−1). This occurs when Q=3 (i.e., a focal pixel, one pixel to the right of the focal pixel, and one pixel to the left of the focal pixel comprises the structuring element).

Although described above and below as applying the binary dilation operator (i.e., a logical OR), the optimization algorithms can use any of the comparison operators. Therefore, the OR operator can equally be replaced by any of the other morphological comparison operators (e.g., AND, MIN, or MAX). Further, steps 504-512 are repeated on the remaining axis.

Figures 6A, 6B, 6C:
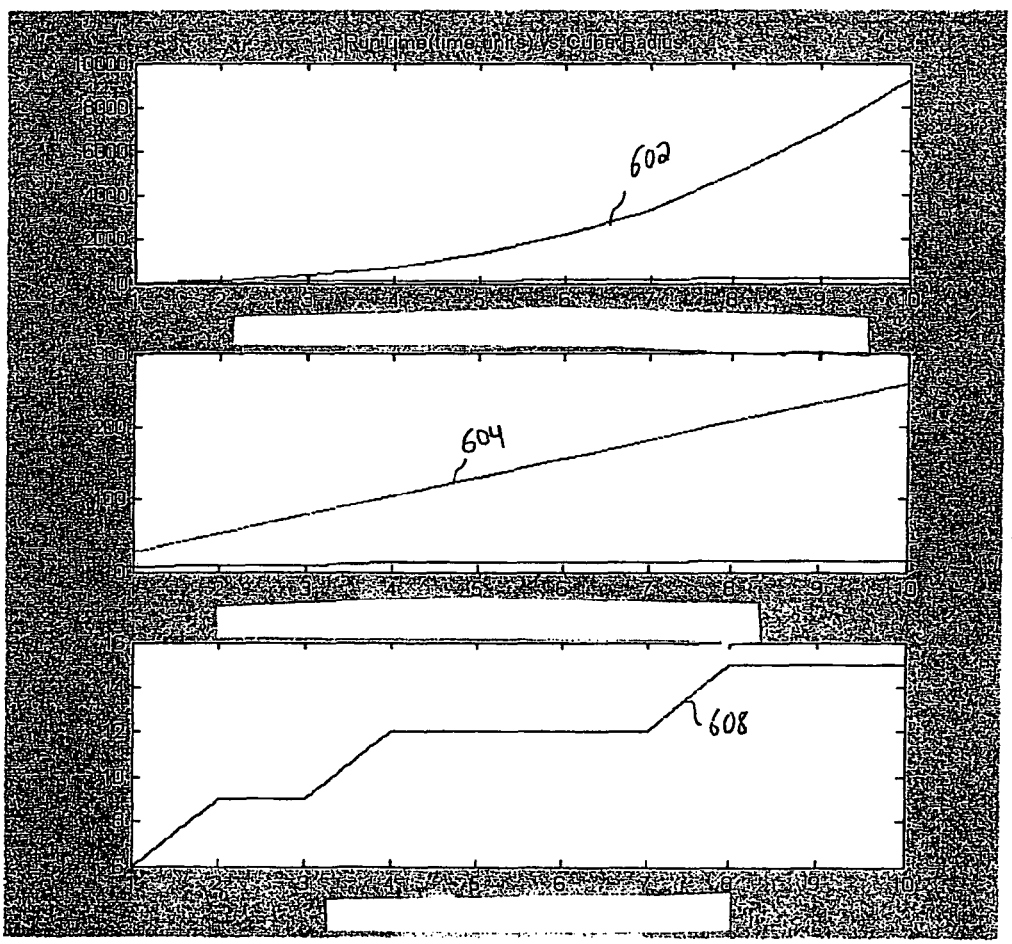
FIGS. 6A-6C show graphical plots of time required using the brute force algorithm, the factorization algorithm, and the optimization algorithm for a cubic structuring element as its radius increases from 1 to 10 versus time in accordance with an embodiment of the invention.

FIGS. 6A-6C show timing plots using the brute force algorithm, the factorization algorithm, and the optimization algorithm for a cubic structuring element as its radius is increased from 1 to 10 versus time.

FIG. 6A shows that the computational expense increases exponentially for the brute force algorithm as the radius of the cubic structuring element increases. Thus, when the radius of a cubic structuring element is 6, curve 602 shows that the time required to apply the structuring element using the brute force algorithm is approximately 2000 units (e.g., seconds). The timing required by the other two methods is barely visible due to the height required to show time for the brute force method.

FIG. 6B shows a curve 604 illustrating that the computational expense for the factorization algorithm increases linearly as the radius of the cubic structuring element increases. When the radius of the cubic structuring element is 6, curve 604 shows that the time required to apply the structuring element using the factorization algorithm is approximately 150 units (e.g., seconds). The time scale has also been reduced from 0-10,000 for the brute force algorithm to 0-300 for the factorization algorithm. The time of the proposed method is again barely visible.

FIG. 6C shows a curve 608 illustrating that the computational expense for the optimization algorithm as described above is proportional to the log of the radius of the cubic structuring element. When the radius of the cubic structuring element is 6, curve 608 shows that the time required to apply the structuring element is approximately 12 units (e.g., seconds). The time scale has also been reduced from 0-300 for the factorization algorithm to 6-16 for the optimization algorithm.

An optimization algorithm can also be applied to a digitally convex structuring element such as a 2-D circle (or ellipse) or a 3-D sphere (or ellipse). Convexity herein means that it is possible to draw a line from the mid-point of any pixel in a digitally convex structure (2-D) to the mid-point of any other pixel in the same structure and that line must either lie totally within the structure, or if part of that line falls outside the structure, then the area bounded by that line segment and the boundary segment of the digital structure that share common start and end points with the said line segment may not contain the mid-point of any pixel that is not part of the considered structure.

In one embodiment, to apply a circular structuring element, two image canvases are needed to accomplish the morphology result using an optimization algorithm. The computer 202 performs the optimization algorithm iteratively, where each iteration includes a span expansion step and a pick out/compare step. At each iteration, the computer 202 "chips away" the structuring element that remains to be addressed.

The structuring element is examined top-down—i.e., its outer-most rows/columns with unique lengths are considered. By way of convexity, each new row/column length encountered will be larger than the previous. As such, the span of the neighborhood whose comparison is represented in each pixel of the work canvas is expanded. This enables the building upon the computation that is already available by way of the previous iteration. The systematic composition of these intermediate results yields the desired morphology result. The decomposition of the structuring element is a "divide and conquer" approach to algorithms (top-down) because it sets the stage for implementing morphology within a framework that draws a close parallel with dynamic programming (bottom-up). Thus, the spatial overlap of comparisons of the original canvas in neighboring output pixels is exploited.

Figure 7:
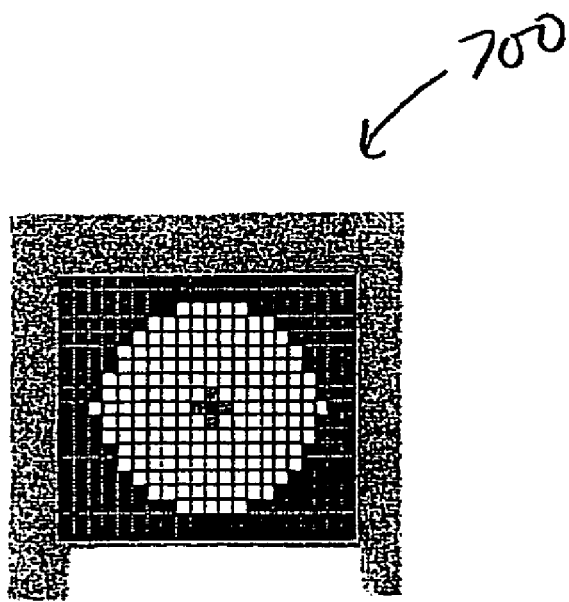
FIG. 7 shows an example of a 2D convex structuring element in accordance with an embodiment of the invention.

FIG. 7 shows an example of a convex structuring element (a 2D digitized circle) 700 having row lengths of {5, 9, 11, 13, 15, 17} and column heights of {1, 5, 9, 11, 13, 15}. This structuring element 700 does not lend itself to the factorization algorithm described above. Two image canvases are updated at each iteration, where an interim work canvas W is first updated to reflect a rectangular span expansion (part 1). This is followed by updating the output image canvas O with a vectorized comparison between itself and the updated W (part 2). In one embodiment, the input image canvas is used for O. Alternatively, a separate image canvas is used.

Figure 8A:
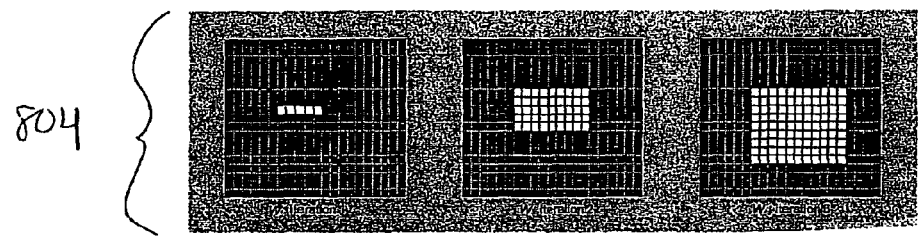
FIGS. 8A and 8B are block diagrams of an application of an optimization algorithm to apply an elliptical structuring element to an image in accordance with an embodiment of the invention.
Figure 8B:
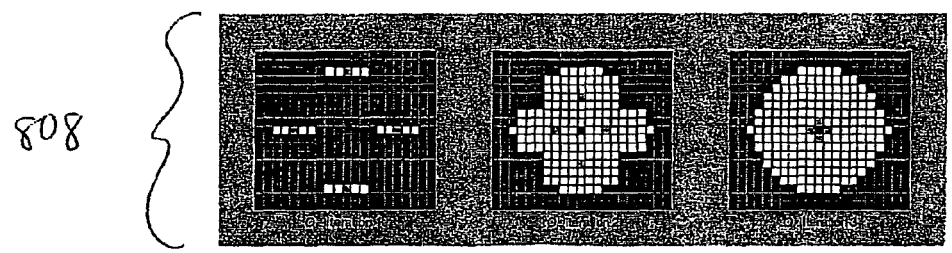

FIGS. 8A and 8B show the two image canvases 804, 808 to the optimization algorithm to apply the 2-D circular structuring element shown in FIG. 7 to an image. The intermediate canvas W 804 contains the results from the original image and computations on itself. The final output image O 808 contains operations done between W and itself. The application finishes in three iterations. In the three iterations of the first part 804, the rectangular dilation footprint of W is increased to the largest rectangle such that, if dilated with the appropriate structuring element, may be used to completely cover the remaining structuring element (RSE). In the three iterations of the second part 808, W is systematically compared with O. The rectangular dilation footprint of W is offset to correlate with the RSE. Thus, each pixel in O is updated with comparisons between itself and W values that are offset from the corresponding locations such that the outer-most unique rows and columns of the RSE may be chipped away.

In particular, the computer 202 first performs in-place dilation on W using a structuring element that is a row of 5 pixels and then traverses that result to build up O in iteration 1. The result is 4 pixels in W being combined into a single central pixel in O, similar to applying a sparse 4 pixel SE. This essentially "chips away" the structuring element that remains to be addressed. The updated RSE now has the top and bottom rows and the left-most and right-most pixel removed with respect to the original structuring element (as shown in FIG. 7).

In iteration 2, W is required to contain the dilation result of the original image with a 9×5 rectangular structuring element since those are the outer most row/column lengths of the RSE (i.e., the outer-most dimensions that were not covered by the structuring element in the previous step). As a result of iteration 1, W already contains the dilation result with a 5×1 rectangular structuring element. Therefore, the computer 202 needs to update W such that the 5×1 rectangular dilation footprint is expanded to a 9×5 rectangular dilation footprint. Note that this step reuses the data from iteration 1, making it more computationally efficient than computing a 9×5 SE from scratch. The pixels in W are then strategically compared with the pixels in O. The dilation footprint that is reflected in each pixel of O at the end of iteration 2 is shown.

In iteration 3, the computer 202 expands the dilation result in W to be 13×9 (which are the outer most row/column lengths of the updated RSE) and do a final round of the picking/comparing with O in order to obtain the desired result. The parameters required to perform the outlined algorithm for any convex, X-Y symmetric structuring element are the number of iterations, the increase in the rectangular span in W for each iteration (i.e., the first part 804), and offsets for selecting W elements with respect to the O focal locations (the second part 808). The padding required in W (i.e., the adjustment (e.g., expansion) of the structuring element) is due to a more general equation than the one described above. This general equation is shown below:

$$M_{min} = \text{CEIL}(\log_2(L_{now}/L_{prev}))$$

Thus, the minimum number of required morphological operations is dependent upon the current length and the previous length of the rectangular structuring element.

Moreover, the optimization algorithm described above for the 2-D circular structuring element also applies to the 3-D spherical structuring element. In the case of a 3D sphere, a 6 or more voxel operator would be used. Another example of the convex structuring element is an ellipse.

Figure 9:
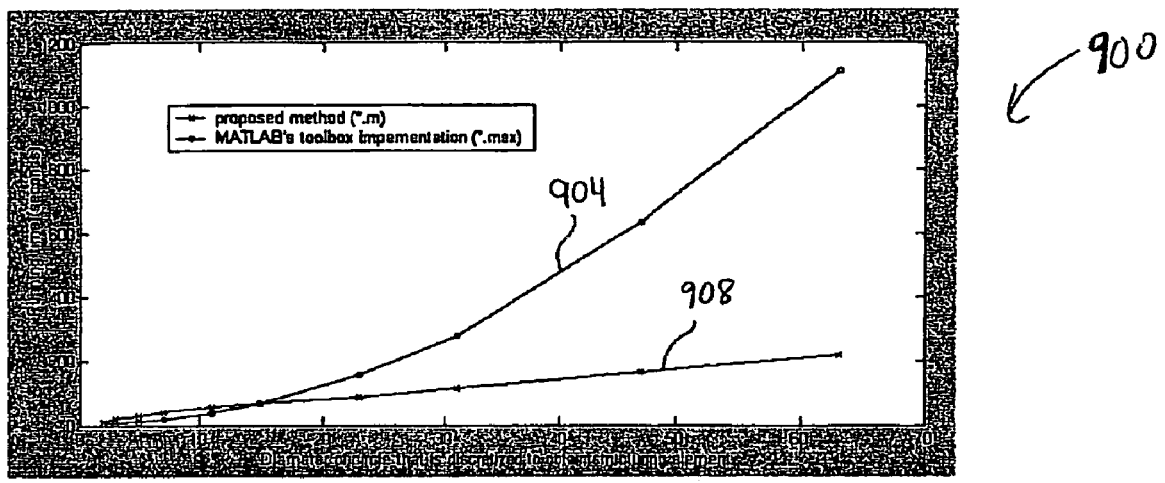
FIG. 9 shows a graphical representation comparing the running times for binary dilation of a 512×512×50 thresholded CT sub-image using 10 circular structuring elements with varying diameters in accordance with an embodiment of the invention and the brute force implementation.

FIG. 9 shows a graphical representation 900 of the running times for binary dilation of a 512×512×50 thresholded CT sub-image using 10 circular structuring elements with varying diameters. The graphical representation 900 shows a plot 904 illustrating the increase in computational time as the radius of a discrete circular structuring element increases when using a prior art (e.g., MATLAB toolbox) algorithm. Plot 908 shows the increase in computational time as the radius of the circular structuring element increases when using the optimization algorithm described above. The highest running time reached for the prior art technique is approximately 1100 seconds while the highest running time reached for the optimization algorithm is approximately 200 seconds in graphical representation 900.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for applying a morphological operation to an image comprising:
   iteratively applying, by a processor, said morphological operation to a focal pixel of said image and to another pixel of said image, said another pixel at an offset with respect to said focal pixel, said offset based on an operation count, wherein each application of said morphological operation compares said focal pixel to only a single other pixel that is separated from said focal pixel by the offset.

2. The method of claim 1 wherein said operation count is the number of times that said morphological operation has been applied.

3. The method of claim 1 wherein said operation count increases from one to a number of operations needed to apply said morphological operation to said image.

4. The method of claim 1 wherein said offset is determined by $2^{N-1}$, where N is said operation count.

5. The method of claim 3 further comprising determining said number of operations needed.

6. The method of claim 5 wherein said number of operations needed is dependent upon a predetermined length of a structuring element.

7. The method of claim 6 wherein said number of operations is based on a logarithm of said predetermined length.

8. The method of claim 7 wherein said number of operations is equal to ceiling ($\log_2$ (Q)), where Q is said predetermined length of said structuring element.

9. The method of claim 8 wherein a last operation of said number of operations proceeds in a reverse direction relative to at least some of other operations.

10. The method of claim 6 wherein said offset of said last operation is a negative of floor(Q/2), where Q is said predetermined length of said structuring element.

11. The method of claim 6 wherein a second to last operation has an offset of ceiling (Q/2)−$2^{(N-2)}$, where Q is said predetermined length of said structuring element and N is said operation count.

12. The method of claim 1 wherein said pixels are voxels.

13. The method of claim 6 wherein said structuring element further comprises a predetermined width.

14. The method of claim 6 wherein said structuring element further comprises a predetermined height.

15. A system for applying a morphological operation to an image comprising:
  means for iteratively applying said morphological operation to a focal pixel of said image and to another pixel of said image, said another pixel at an offset with respect to said focal pixel, said offset based on an operation count, wherein each application of said morphological operation compares said focal pixel to only a single other pixel that is separated from said focal pixel by the offset.

16. The system of claim 15 wherein said operation count is the number of times that said morphological operation has been applied.

17. The system of claim 15 wherein said operation count increases from one to a number of operations needed to apply said morphological operation to said image.

18. The system of claim 15 wherein said offset is determined by $2^{N-1}$, where N is said operation count.

19. The system of claim 17 further comprising means for determining said number of operations needed.

20. The system of claim 19 wherein said number of operations needed is dependent upon a predetermined length of a structuring element.

21. The system of claim 20 wherein said number of operations is based on a logarithm of said predetermined length.

22. The method of claim 21 wherein said number of operations is equal to ceiling ($\log_2 (Q)$), where Q is said predetermined length of said structuring element.

23. The system of claim 22 wherein a last operation of said number of operations proceeds in a reverse direction relative to at least some of other operations.

24. The system of claim 23 wherein said offset of said last operation is a negative of floor(Q/2), where Q is said predetermined length of said structuring element.

25. The system of claim 23 wherein a second to last operation has an offset of ceiling $(Q/2)-2^{(N-2)}$, where Q is said predetermined length of said structuring element and N is said operation count.

26. The system of claim 15 wherein said pixels are voxels.

27. The system of claim 20 wherein said structuring element further comprises a predetermined width.

28. The system of claim 20 wherein said structuring element further comprises a predetermined height.

29. The method of claim 1, wherein the step of iteratively applying said morphological operator comprises:
  at each iteration, repeating the application of said morphological operator with each of a plurality of pixels in the image as the focal pixel.

30. The system of claim 15, wherein the means for iteratively applying said morphological operator comprises:
  means for repeating the application of said morphological operator with each of a plurality of pixels in the image as the focal pixel.

* * * * *